June 8, 1926.
C. W. OLSON
1,587,983
STEERING MECHANISM FOR MOTOR VEHICLES
Filed Oct. 29, 1924
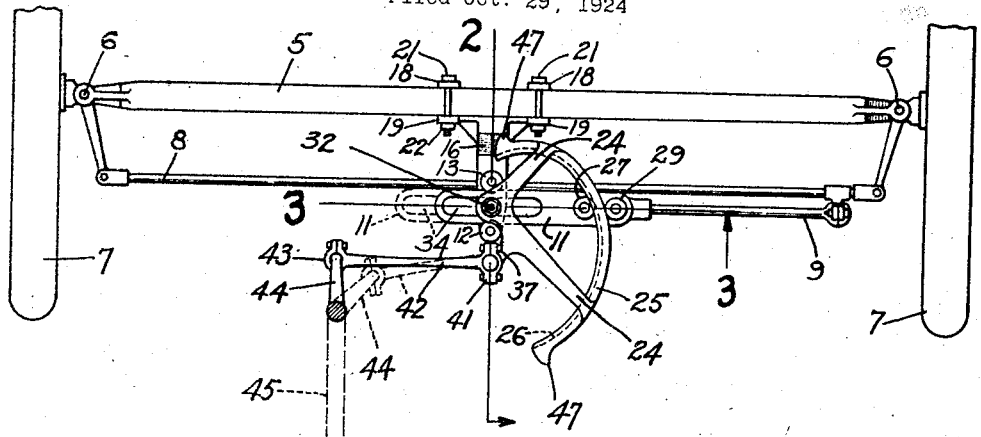
FIG.1
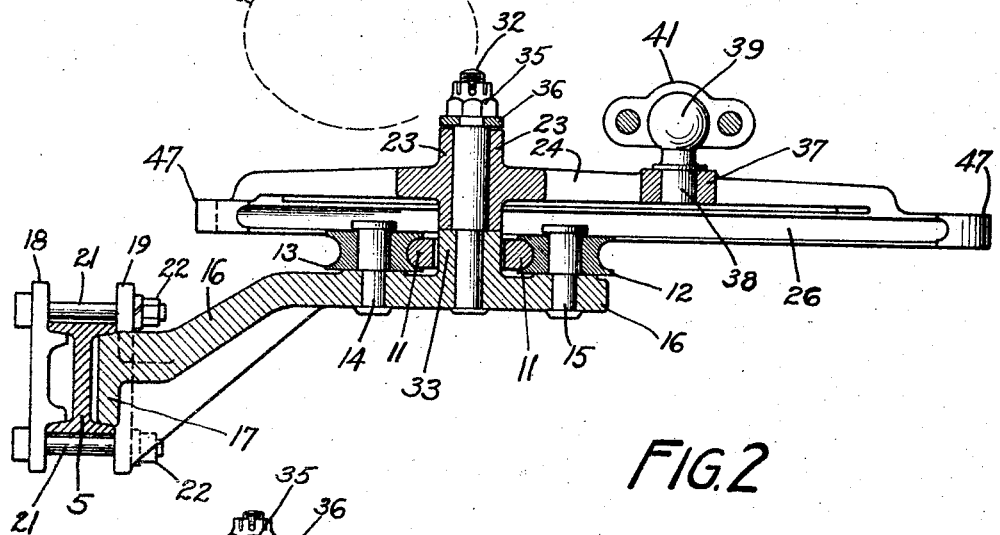
FIG.2
FIG.3
INVENTOR
CARL W. OLSON
By Paul, Paulo Moore
ATTORNEYS Patented June 8, 1926.

1,587,983

UNITED STATES PATENT OFFICE.

CARL W. OLSON, OF MINNEAPOLIS, MINNESOTA, ASSIGNOR TO AMERICAN SAFETY EQUIPMENT CORPORATION, OF MINNEAPOLIS, MINNESOTA, A CORPORATION OF DELAWARE.

STEERING MECHANISM FOR MOTOR VEHICLES.

Application filed October 29, 1924. Serial No. 746,574.

This invention relates to an improved steering mechanism for motor vehicles which is simple in construction and operation, is durable and not liable to derangement and is one that is particularly adapted for substitution for the present steering mechanisms used in certain low-priced motor vehicles in common use.

A disadvantage of certain steering-gears which are not of the worm and sector type, as well as of some which are, resides in the fact that the thrusts and impact of obstructions on the road are directly communicated to the usual steering wheel and, further, that travel along sandy roads makes certain and accurate control of vehicle direction difficult. In other words, this present mechanism is of the irreversible type.

The object therefore of this invention is to provide a simple, durable and efficient steering mechanism for motor vehicles.

Other objects of the invention will more fully appear from the following description and the accompanying drawings and will be pointed out in the annexed claims.

In the accompanying drawings, there has been disclosed a structure designed to carry out the objects of the invention but it is to be understood that the invention is not confined to the exact features shown, as various changes may be made within the scope of the claims which follow.

In the drawings:

Figure 1 is a plan view of the novel mechanism showing associated parts of a common form of motor-vehicle;

Figure 2 is a vertical sectional view on the line 2—2 of Figure 1; and

Figure 3 is a vertical sectional view on the line 3—3 of Figure 1;

In connection with this selected embodiment of the invention there is shown the usual front axle 5, steering knuckles 6, front wheels 7 and the usual tie-rod 8 connected to each of the steering knuckles for simultaneous turning movement of the front wheels. In accordance with usual practice a steering arm 9 is connected, as shown, to the tie-rod so that movement imparted to the steering arm 9 will change the position of the tie-rod 8 and turn the front wheels to give a change of direction to the vehicle which is not necessary to be shown.

In this novel construction a substantially reciprocatory rectilinear movement is imparted to the steering arm 9 by means of a slide 11. This slide preferably has its outer longitudinal sides convexed complementarily to the concaved form of the two opposed peripheral grooved rollers 12 and 13 rotatably mounted upon headed pins 14 and 15 borne by a bracket 16 secured to the vehicle. The forward end of this bracket preferably terminates in a suitably shaped flange 17 adapted to be received within the adjacent recess of the usual I-shaped front axle 5. A suitable means for rigidly securing the brackets 16 to the front axle is shown by the clamping bars 18 and 19 held in operative relation by the bolts 21 and their nuts 22. The slide is thus supported in a freely movable position by the bracket.

The means for moving the slide consists of a cam member which cooperates with cam followers carried by the slide. The particular cam member here shown is an elongated one and consists of a hub portion 23 with a plurality of radially extending spokes 24 terminally carrying the elongated cam 25. This cam is of a curvilinear form, and while the spokes are preferably integral therewith, the cam is held in a substantially depending relation operatively to present the concave or grooved inner face 26 to the peripherally convexed roller 27 rotatably mounted upon the pin 28 carried by the slide 11. The corresponding outer face of the cam 25 has substantially a plane face against which the peripheral face of the cylindrical roller 29 abuts, this roller being rotatably mounted upon the pivot pin 31 also carried by the slide 11.

The hub 23 of this cam member is centrally bored and rotatably mounted upon the pin 32 which is borne by the bracket 16. It may be noted that the bracket 16 adjacent the pin 32 is formed with an upwardly projecting boss 33 upon the finished upper face of which rests the underface of the hub 23. It may also be noted that the slide 11 is provided with an elongated aperture 34 and that the boss upwardly projects through this aperture, the aperture being of a size so as to be freely movable with relation to the boss 33. This assembly aids in assuring a compact efficient construction. The hub 23 is held upon its pin 32 by means of the castle nut 35 and interposed spacing washer 36.

The hub of the cam member is provided with an integral extension 37 carrying a collared stud 38 securely fixed thereto. The upper end of this stud terminates in an integral ball 39 embraced by the two-part socket 41, thus forming a ball-and-socket joint. The two parts of the socket are bolted together as is suggested in Figures 1 and 2. One part of the socket is integral with an arm 42 and the other end of the arm 42 carries a similar socket 43 of usual construction receiving a common form of ball carried on the crank-arm 44 which is terminally mounted upon the lower end of the steering post 45. The steering post 45 and crank-arm 44 and its ball-and-socket connection are of usual construction. There has been diagrammatically indicated a steering wheel 46 shown in dotted lines in Figure 1 by means of which the steering post 45 is rotated.

When the parts are in the position shown in Figure 1, it will be noted that the cam followers and the cam hub are in axial alinement so that any lateral thrust against the front wheels 7 reacts against these alined parts with the result that the cam does not move but remains in its fixed position so that the direction of travel of the car is not deflected only as such a shock imparted to the driver's hand upon the steering wheel. Furthermore, these cam followers always maintain their alinement with the cam hub due to rectilinear travel of the slide so that the same result is attained in all turned positions of the front wheel. Upon rotation of the steering wheel 46, the post 45 is likewise turned and the offset crank-arm 44 may be moved from the full lines to the dotted line position shown in Figure 1. Hence the arm 42 would be moved to the right with the result that the cam hub would be rotated and the cam itself would move between its abutting followers or rollers 27 and 29. The shape of the cam is, of course, eccentric with the result that the slide is moved to the right because the rear portion of the cam has a greater radial distance from the hub than its forward portion. The turning movement is limited by the enlarged head 47 upon opposite ends of the cam.

When the steering post is rotated in the opposite, or counter-clockwise direction, the forward portion of the cam (which is radially nearer the hub than the rear portion) will draw the slide to the left of its position shown in Figure 1 with the result that the steering wheels 7 are turned in an opposite direction. The extreme of such turning movement is defined by the forward cam-head 47 when it is rearwardly drawn to a position at the spaced cam followers or rollers 27 and 29.

In the construction of this durable and efficient steering mechanism it is preferable to have the cam followers arranged so as to engage the opposite faces of the cam constantly. In other words, it is preferable to obviate any play between the cam and its opposed followers. If not, chattering of the front wheels would result. It may also be noted that due to the employment of this eccentrically curved cam a leverage is obtained for imparting turning movements to the front wheels. Furthermore, the steering strains are taken up at the center of the front axle of the vehicle and not at one side.

Having thus described my invention what I claim as new and desire to secure by Letters-Patent, is:

1. In a steering mechanism for motor vehicles, the combination of a support extending from the front axle of the vehicle, a slide borne by the support and operatively connected to the vehicle steering-wheels, a cam pivotally borne by the support, guide rolls borne by the support to engage opposite sides of the slide, the axes of the rolls and cam pivot being in substantially alined parallelism, cam followers on the slide adapted to engage substantially constantly opposite faces of the cam whereby upon movement of the cam, the slide is actuated, and means to move the cam.

2. In a steering mechanism for motor vehicles, the combination of an elongated cam pivotally borne by the vehicle, a cam-actuated device also borne thereby and operatively connected to the steering-wheels thereof, cam followers on said device adapted to engage substantially constantly opposite faces of the cam, one of said cam faces having a longitudinally extending recess and one of said followers being complementarily formed for operative reception in said recess, and means for moving the cam.

3. In a steering mechanism for motor vehicles, the combination of a support extending from the front axle of the vehicle, a device movably borne by the support and operatively connected to the vehicle steering wheels, a cam pivotally borne by the support, cam followers on the movable device adapted to engage substantially constantly opposite faces of the cam whereby upon movement of the cam, the movable device is actuated, and means to move the cam.

In witness whereof, I have hereunto set my hand this 27th day of October 1924.

CARL W. OLSON.